US010545965B2

(12) United States Patent
Sun et al.

(10) Patent No.: US 10,545,965 B2
(45) Date of Patent: Jan. 28, 2020

(54) DATA SKEW FINDING AND ANALYSIS (71) Applicant: Microsoft Technology Licensing, LLC, Redmond, WA (US)

(72) Inventors: Jin Sun, Sammamish, WA (US); Omid Afnan, Beijing (CN); Yifung Lin, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 864 days.

(21) Appl. No.: 15/199,507

(22) Filed: Jun. 30, 2016

(65) Prior Publication Data
US 2017/0091185 A1   Mar. 30, 2017

Related U.S. Application Data

(60) Provisional application No. 62/233,114, filed on Sep. 25, 2015.

(51) Int. Cl.
  *G06F 16/00*   (2019.01)
  *G06F 16/2455*  (2019.01)
  *G06F 9/48*    (2006.01)

(52) U.S. Cl.
  CPC ...... *G06F 16/24565* (2019.01); *G06F 9/4881* (2013.01)

(58) Field of Classification Search
  CPC .................................................. G06F 16/24565
  USPC ........................................................ 707/603
  See application file for complete search history.

(56) References Cited

U.S. PATENT DOCUMENTS

| 8,560,499 | B2 | 10/2013 | Hunur et al. |
| 8,768,963 | B2 | 7/2014 | Kothari et al. |
| 8,799,272 | B2 | 8/2014 | Al-Omari et al. |
| 9,031,994 | B1 | 5/2015 | Cao et al. |
| 2013/0152057 | A1* | 6/2013 | Ke ........................... G06F 8/453 717/132 |
| 2013/0254196 | A1 | 9/2013 | Babu et al. |
| 2014/0379692 | A1* | 12/2014 | Teletia ................... G06F 16/278 707/714 |

OTHER PUBLICATIONS

Dongsheng et al. "Skew-Aware Task Scheduling in Clouds", IEEE 7th International Symposium on Service Oriented System Engineering, Mar. 25, 2013, pp. 341-346.

(Continued)

*Primary Examiner* — Chelcie L Daye
(74) *Attorney, Agent, or Firm* — Workman Nydegger (57) ABSTRACT

Reducing data skew when performing computational jobs (such as responding to complex queries or queries on big data sets). To gather performance information for a vertex in a distributed stage, the distributed stage is processed and the resulting performance information being generated. The system then identifies a performance outlier of the vertices, which varies from a performance norm of other vertices. A trigger instruction is then generated that is structured to trigger the performance outlier vertex to gather data distribution information of the data that the performance outlier vertex previously processed. The trigger instruction may thus be executed to cause the performance outlier vertex to gather the data distribution information for evaluation for data skew.

20 Claims, 10 Drawing Sheets

(56) References Cited

OTHER PUBLICATIONS

International Search Report and Written Opinion issued in PCT Application No. PCT/US2016/052369, dated Jan. 2, 2017.
International Preliminary Report on Patentability issued in PCT Application No. PCT/US2016/052369 dated Nov. 24, 2017.
Liroz-Gistau, et al., "FP-Hadoop: Efficient Execution of Parallel Jobs over Skewed Data", In Proceedings of the VLDB Endowment, vol. 8, Issue 11, Aug. 12, 2015, 5 pages.
Garduno, et al., "Theia: Visual Signatures for Problem Diagnosis in Large Hadoop Clusters", In Proceedings of the 26th international conference on Large Installation System Administration: Strategies, Tools, and Techniques, Dec. 9, 2012, pp. 33-42.
"Optimizing MapReduce Jobs Using Perfect Balance", Retrieved on: Sep. 18, 2015 Available at: http://docs.oracle.com/cd/E52525_01/doc.25/e52475/balance.htm#BIGUG279.
Kwon, et al., "Managing Skew in Hadoop", In Proceedings of IEEE Data Engineering Bulletin, vol. 36, Issue 1, 2013, pp. 1-10. Mar. 2013, pp. 1-10.
Herodotou, Herodotos, "Automatic Tuning of Data-Intensive Analytical Workloads", In Thesis of Ph. D. Dissertation, May 2012, 207 pages.
"SQL Scripts for Detecting Skew", Retrieved on: Sep. 18, 2015 Available at: http://www.info.teradata.com/HTMLPubs/DB_TTU_14_00/index.html#page/Database_Management/B035_1094_111A/ch09.050.139.html.
Zacheilas, et al., "Real-Time Scheduling of Skewed MapReduce Jobs in Heterogeneous Environments", In Proceedings of the 11th International Conference on Autonomic Computing, Jun. 18, 2014, pp. 189-199.
Gufler, et al., "Handling Data Skew in Mapreduce", In Proceedings of International Conference on Cloud Computing and Services Science, May 7, 2011, pp. 574-583.
Ananthanarayanan, Ganesh, "Research Statement", In Thesis Research, Aug. 13, 2013, 3 pages.
Written Opinion of the International Preliminary Examining Authority issued in PCT Application No. PCT/US2016/052369 dated Feb. 27, 2017.

* cited by examiner

DATA SKEW FINDING AND ANALYSIS

CROSS-REFERENCE TO RELATED APPLICATION

This application claims the benefit of U.S. Provisional Patent Application Ser. No. 62/233,114, filed Sep. 25, 2015, which provisional patent application is incorporated herein by reference in its entirety.

BACKGROUND

Computing systems and associated networks have revolutionized the way human beings work, play, and communicate. Nearly every aspect of our lives is affected in some way by computing systems. Computing systems are particularly adept at processing data. When processing data for which a schema is applied on read, rather than write, (often referred to simply as "big data") that itself might be distributed across multiple network nodes, it is often most efficient to divide data processing amongst the various network nodes. These divisions of logical work are often referred to as "vertices" in the plural, or a "vertex" in the singular. Not only does this allow for efficiencies of parallelizing, but it also allows for the data that is being processed to be closer to the processing node that is to process that portion of the data.

One common programming model for performing such parallelization is often referred to as the map-reduce programming model. In the mapping phase, data is divided by key (e.g., along a particular dimension of the data). In the reduce phase, the overall task is then divided into smaller portions that can be performed by each network node, such that the intermediate results obtained thereby can then be combined into the final result of the overall job. Many big data analytical solutions build upon the concept of map reduce.

One problem often encountered in big data analytics is uneven distribution of data along a given dimension—referred to as "data skew". This is a common occurrence in big data sets which can arise from natural data distributions and/or poor query formulation. The amount and characteristics of data skew may change over time as the data itself changes. Data skew can result in some network nodes taking a lot more time to perform their respective tasks, thereby effectively introducing bottlenecks in the distributed parallel processing, and thereby delaying completion of the overall tasks. When the source of the data skew is identified, the data skew can be corrected reallocating the distribution of processing amongst the data and/or correcting code that is having a more difficult time dealing with the data skew. However, identifying the source of data skew is quite difficult, even from the perspective of an experienced developer.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a computing system that assists in reducing data skew when performing computational jobs (such as responding to complex queries or queries on big data sets). In order to gather performance information for a vertex in a distributed stage having multiple vertices, the distributed stage (and potentially the entire computational job) is processed and the resulting performance information measured or taken. Potentially, the distributed stage or the entire distributed job is performed only once in a single run.

The computing system then identifies a performance outlier of the vertices, which varies from a performance norm of other vertices. For instance, the performance outlier vertex may have taken significantly longer than the other vertices of the parallel stage of the computational job. As another example, perhaps the performance outlier vertex read and/or wrote a lot more data than the other vertices of the parallel stage of the computational job. A trigger instruction (e.g., a special script) may then be generated that is structured to trigger the performance outlier vertex to gather data distribution information of the data that the performance outlier vertex previously processed in the prior performance(s) of the distributed stage or distributed job. The trigger instruction may thus be executed (e.g., by a job scheduler), to cause the performance outlier vertex to gather the data distribution information.

As an example, the special script might be like the original job description (e.g., like the query of a query system) but stops at the point where the suspected data skew occurs. This special script then submits a query that only generates statistics in the form of data distribution information (e.g., counts) for the individual data portions in a partition. This special query returns detailed information that allows adjustment of the original query or pipeline to deal with the skew thus identified. For instance, the suspect vertex or the data processed by the suspect vertex may then be altered to remove or reduce the data skew of the suspect vertex, thereby allowing faster processing of the job or future jobs due to reduced data skew.

This approach significantly reduces the problem space in skew detection. It allows, during potential just a single run of a stage or job, to identify the location of skewed data processing and to run truncated queries to identify the actual skewed distributions. This avoids running a large set of experiments to find distributions in multiple datasets/queries in the same script. It also saves resources by collecting statistics only rather than processing all data in the subsequent investigation phase.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

The FIG. 3 illustrates a stage of a distributed job, the stage having a number of parallel vertices to perform, one or more of which vertices being potential performance outliers due to data skew.

DETAILED DESCRIPTION

At least some embodiments described herein relate to a computing system that assists in reducing data skew when performing computational jobs (such as responding to complex queries or queries on big data sets). In order to gather performance information for a vertex in a distributed stage having multiple vertices, the distributed stage (and potentially the entire computational job) is processed and the resulting performance information measured or taken. Potentially, the distributed stage or the entire distributed job is performed only once in a single run.

The computing system then identifies a performance outlier of the vertices, which varies from a performance norm of other vertices. For instance, the performance outlier vertex may have taken significantly longer than the other vertices of the parallel stage of the computational job. As another example, perhaps the performance outlier vertex read and/or wrote a lot more data than the other vertices of the parallel stage of the computational job. A trigger instruction (e.g., a special script) may then be generated that is structured to trigger the performance outlier vertex to gather data distribution information of the data that the performance outlier vertex previously processed in the prior performance(s) of the distributed stage or distributed job. The trigger instruction may thus be executed (e.g., by a job scheduler), to cause the performance outlier vertex to gather the data distribution information.

As an example, the special script might be like the original job description (e.g., like the query of a query system) but stops at the point where the suspected data skew occurs. This special script then submits a query that only generates statistics in the form of data distribution information (e.g., counts) for the individual data portions in a partition. This special query returns detailed information that allows adjustment of the original query or pipeline to deal with the skew thus identified. For instance, the suspect vertex or the data processed by the suspect vertex may then be altered to remove or reduce the data skew of the suspect vertex, thereby allowing faster processing of the job or future jobs due to reduced data skew.

This approach significantly reduces the problem space in skew detection. It allows, during potential just a single run of a stage or job, to identify the location of skewed data processing and to run truncated queries to identify the actual skewed distributions. This avoids running a large set of experiments to find distributions in multiple datasets/queries in the same script. It also saves resources by collecting meta-data only rather than processing all data in the subsequent investigation phase.

Some introductory discussion of a computing system will be described with respect to FIG. 1. Then, the mechanism and methods that enable efficient identification and correction of data skew related performance problems will be described with respect to FIGS. 2 through 10.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
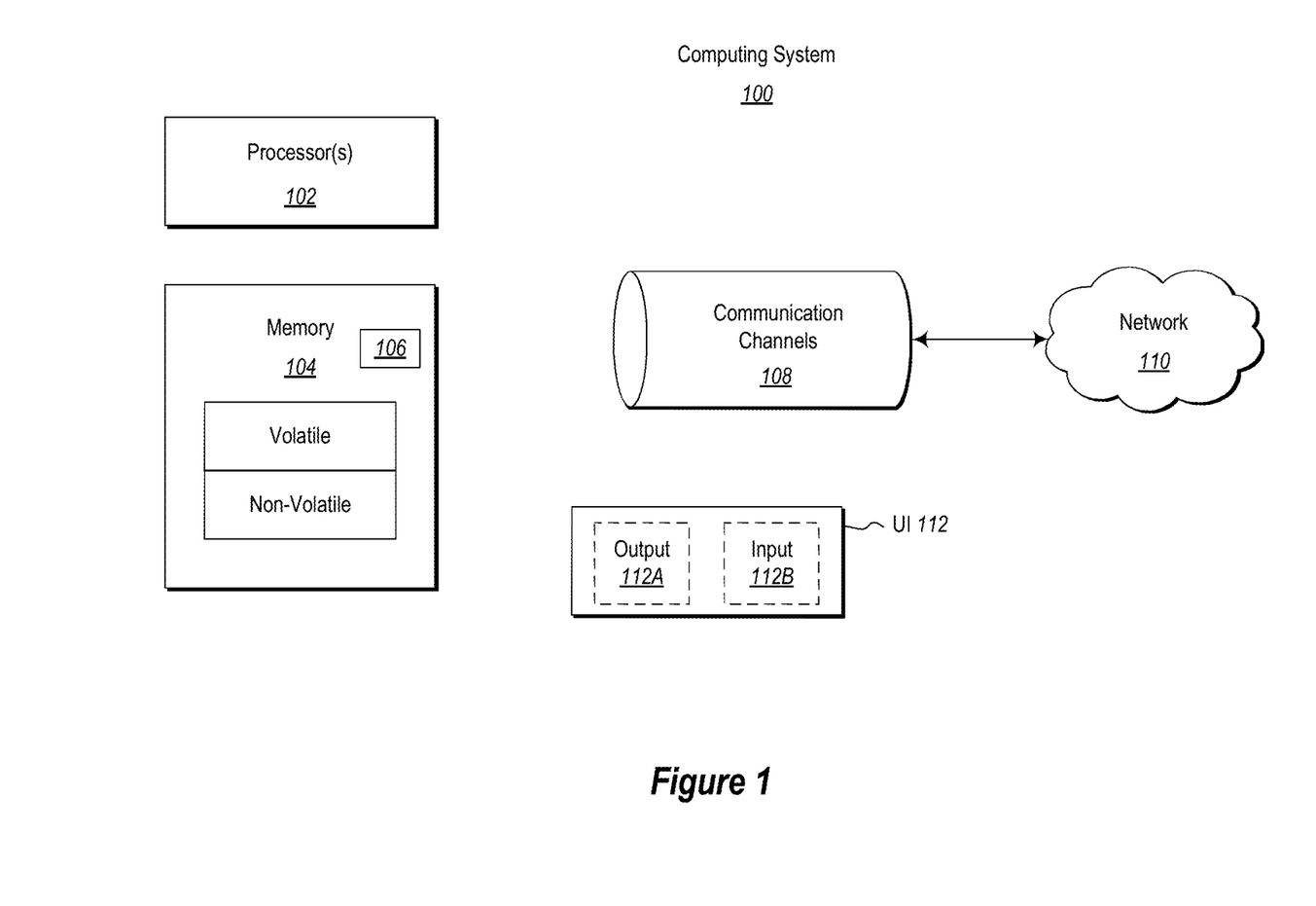
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "scheduler", "manager", "module", "compiler", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms, virtual reality objects, and so forth. Examples of input mechanisms 112B might include, for instance, microphones, touchscreens, holograms, cameras, keyboards, accelerometers, levers, pedals, buttons, knobs, mouse of other pointer input, sensors of any type, virtual reality objects, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
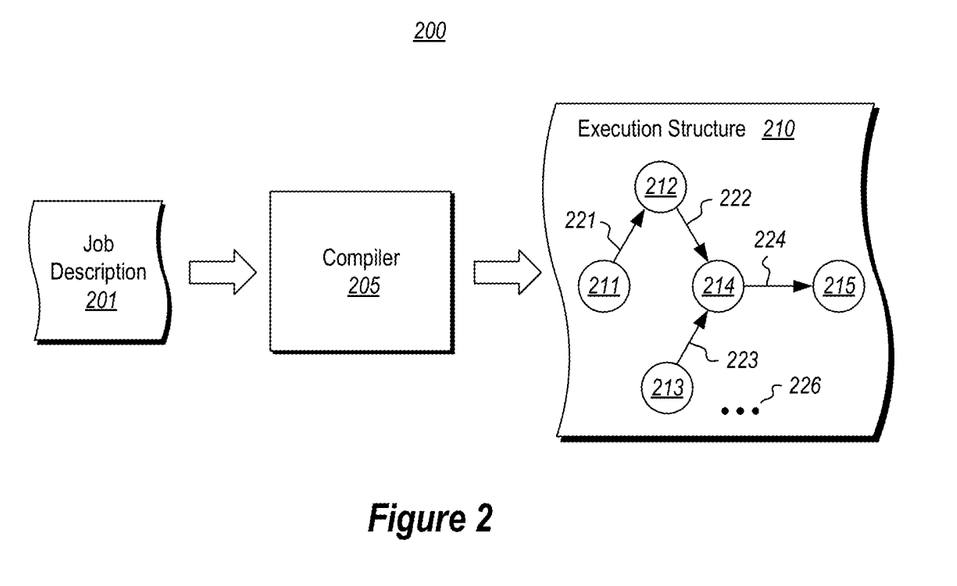
FIG. 2 illustrates an architecture in which a job description is compiled by into an execution structure having multiple stages.

FIG. 2 illustrates an architecture 200 in which a job description 201 is compiled by a compiler 205 into an execution structure 210. The compiler 205 may, for instance, be a computing system such as the computing system 100 described above with respect to FIG. 1. The compiler 205 may alternatively or more specifically be a software component (e.g., executable component 106) that runs on a computing system such as the computing system 100 described above with respect to FIG. 1. In one example, the job description 201 may be a query. However, the job description 201 may be any definition of a computational job to be accomplished.

Figure 3:
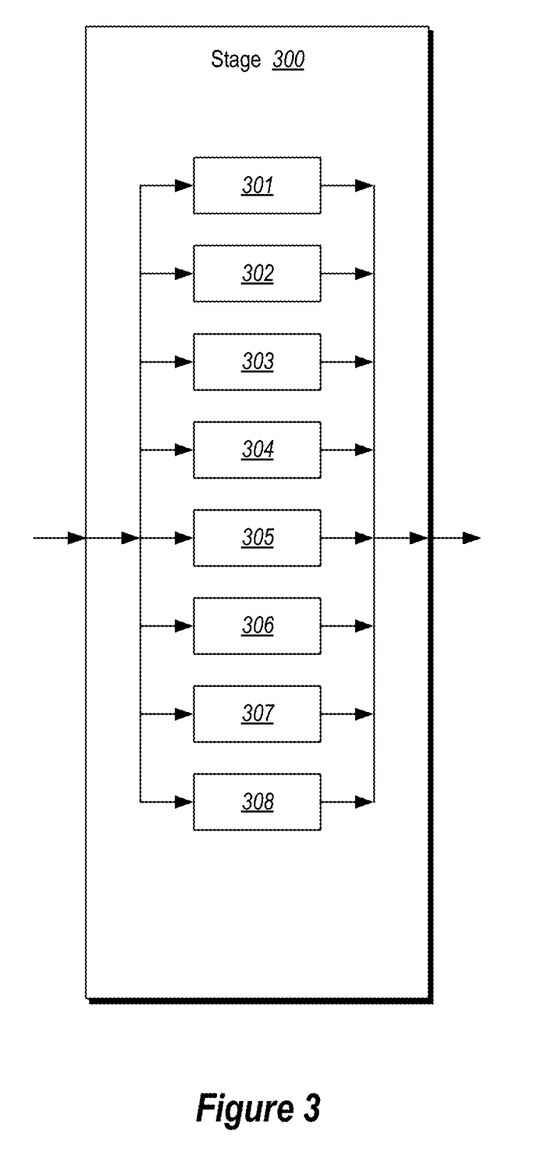

In FIG. 2, the execution structure 210 is illustrated as including five stages 211 through 215 that have certain dependences represented by arrows 221 through 224. However, the ellipses 216 represent that the principles described herein are not limited to the exact structure of the execution structure 210. Each stage has a vertex to perform or may have multiple vertices to perform in parallel. For instance, FIG. 3 illustrates a stage 300 that has 8 parallel vertices 301 through 308 to perform. Depending on data skew, one or more of these parallel vertices 301 through 308 may deviate significantly from a performance norm in order to handle the skew in the data.

The execution structure 210 will depend on the job to be accomplished (i.e., the job description 201), how the compiler 210 decides the job is to be divided into smaller logical tasks (referred to as a vertex), and the dependencies that exist between those vertices. In the most trivial case, the execution structure may simply be a single stage. In more complex cases, the execution structure may comprise thousands or even perhaps millions of stages. In any case, the principles described herein are applicable regardless of the execution structure, how many vertices exist in the execution structure, and how the vertices are interrelated.

Figure 4:
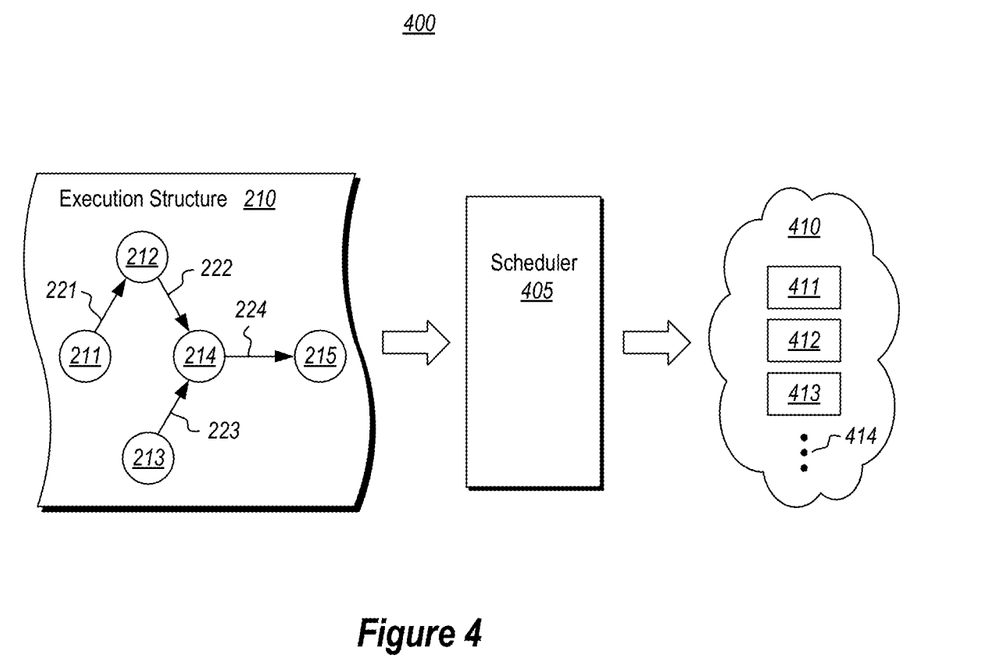
FIG. 4 illustrates an environment in which a scheduler uses the execution structure to determine when the tasks associated with a vertex is to be performed, and on what processing node within a distributed environment.

FIG. 4 illustrates an environment 400 in which a scheduler 405 uses the execution structure 210 to determine when the tasks associated with a vertex is to be performed, and on what processing node within a distributed environment 410. In this description and in the claims, a "processing node" is an allocable unit of processing in a distributed environment for use in running remotely provided code (such as a vertex). For instance, the processing node could be a processing core in a cloud computing environment. Again the scheduler 405 may be a computing system such as the computing system 100 of FIG. 1, or may be software (e.g., executable component 106) that executes on such a computing system. The distributed environment 410 is illustrated as including three processing nodes 411 through 413, though the ellipses 414 symbolizes that the distributed environment may include any number of processing nodes capable of performing tasks of the job represented by the execution structure 210. In one embodiment, the distributed environment 410 is a cloud computing environment.

Figure 5:
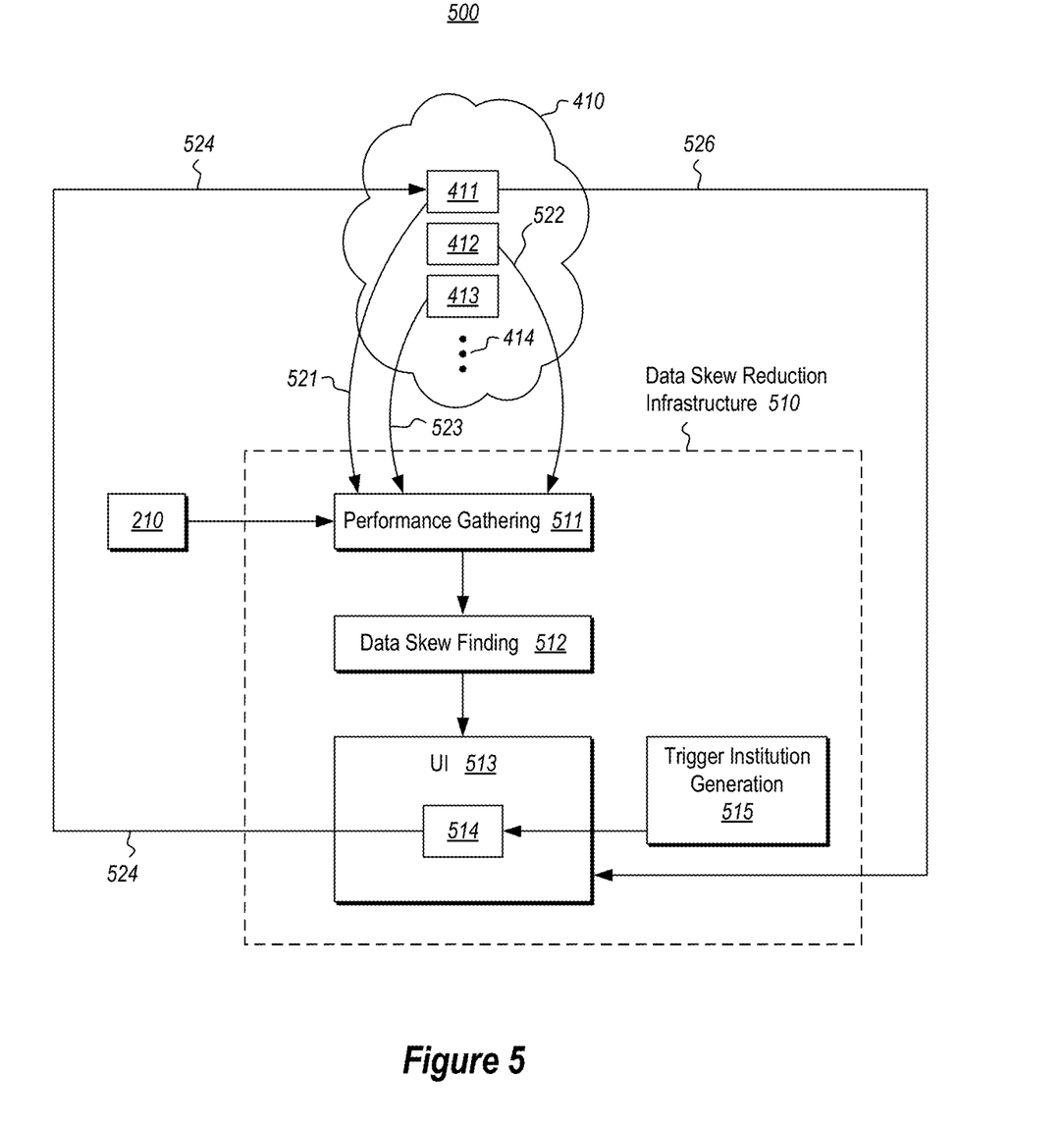
FIG. 5 illustrates an environment in which the stage having multiple parallel vertices (or perhaps an entire job that includes such a stage) is run.
Figure 6:
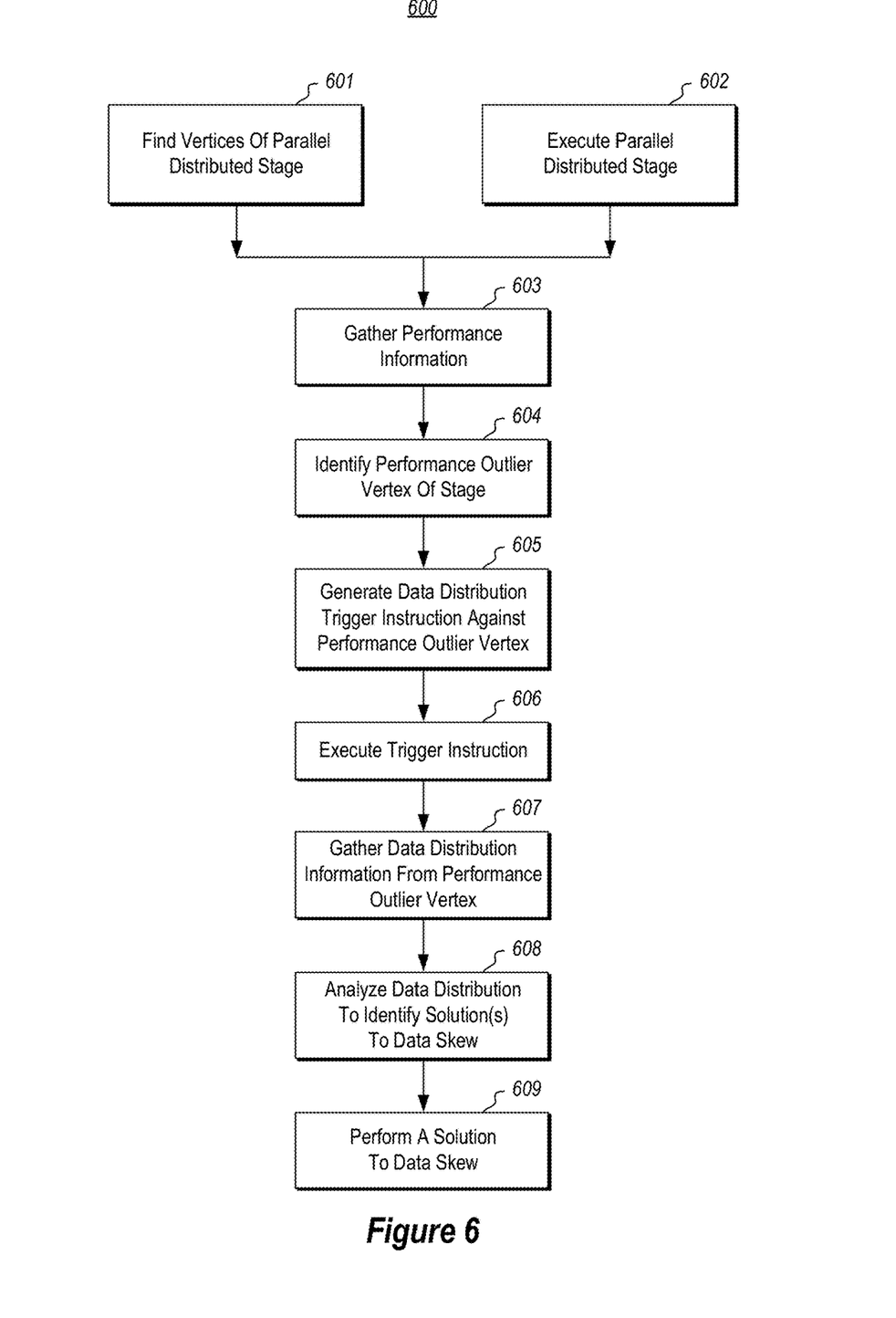
FIG. 6 illustrates a flowchart of a method for reducing data skew and may be performed in the environment of FIG. 5.

FIG. 5 illustrates an environment 500 in which the stage having multiple parallel vertices (or perhaps an entire job that includes such a stage) is run to gather performance information regarding the running of each vertex, and to then gather data distribution information from performance outlier vertices to identify data skew. FIG. 6 illustrates a flowchart of a method 600 for reducing data skew and may be performed in the environment 500 of FIG. 5. Accordingly, the operating of the environment 500 of FIG. 5 will now be described with frequent reference to the flowchart of FIG. 6

The environment 500 of FIG. 5 may essentially be the same as the environment 400 of FIG. 4 in that the environment 500 includes the distributed environment 410 of FIG. 4. However, the environment 500 also includes a data skew reduction infrastructure 510. The data skew reduction infrastructure 510 or any of its components, or combination of components, may be a computing system (or software running on a computing system) as described above with respect to the computing system 100 of FIG. 1.

The data skew reduction infrastructure 510 includes a processing gathering component 511 configured to use the execution structure 210 generated by the job compiler 205 to find a set of processing nodes that process data as part of processing a vertex of distributed stage of the distributed job. For instance, the data skew reduction infrastructure 511 may find that the three processing nodes 511, 312 and 313 each process data as part of performing a vertex of the distributed stage. Such processing data might include, for instance, data reads, data writes, joining of data, construction of data, and so forth. Referring to FIG. 6, the method includes finding a set of processing nodes that process data as part of a vertex of a distributed stage of a distributed job (act 601).

The performance gathering module 511 also, for at least some of the processing nodes that process data as part of their vertex, gathers performance information regarding the processing of the vertex (act 603). In order to gather such performance information, however, the distributed stage, a portion of the computational job that includes the distributed stage and/or the entire distributed job is performed (act 602). While this running of the distributed stage, portion or job may occur just once to gather the performance information, the running may have also happened multiple times to gather the performance information Such performance information for each given vertex might include, for instance, a number of reads performed, a number of writes performed, a total number of processing cycles expended, a time elapsed, a type and/or amount of data constructed, and so forth. Such gathering and associated gathered performance information is represented in FIG. 5 by arrows 521, 522 and 523. The performance gathering module 511 may maintain a vertex data structure for each vertex and that includes a variety of fields including a vertex identifier and operational data. The operational data might include information regarding execution of the vertex on the associated processing node scheduled by the scheduler. For instance, the operational data may include a processing node identifier, a vertex result indication, a duration field, and so forth.

The data skew finding component 512 applies rules against the gathered processing information 521, 522 and 523 to identify a performance outlier vertex of the distributed stage (e.g., see act 604 of FIG. 6). For instance, the data skew finding component 512 may identify which vertices of the parallel stage vary from a performance norm as compared to the other vertices of the parallel stage. For instance, suppose that the vertex of processing node 311 is suspected of having lower performance (e.g., unusually large execution times) due to data skew. The data skew finding component 512 may thus find where the data skew is so that the suspect vertex may be altered to remove or reduce the data skew. This would allow faster processing of the job or future jobs due to the reduced data skew.

A user interface module 513 may present a representation of at least one of the suspect performance outlier vertices to the user. Alternatively, or in addition, the user interface module 513 may present to the user a representation of the gathered performance information for that suspect performance outlier vertex potentially outlined against the gathered performance information for the other vertices of the distributed parallel stage.

The system then formulates a trigger instruction that is structured to trigger the performance outlier vertex to gather data distribution information of the data that the performance outlier vertex processed in at least one of the one or more prior performances of the distributed stage. This trigger instruction may be, for instance, a special script might be like the original job description (e.g., like the query if a query system) but stops at the point where the suspected data skew occurs. This special script then submits a query that only generates statistics in the form of data distribution information (e.g., counts) for the individual data portions in a partition. This special query returns detailed information that allows adjustment of the original query or pipeline to deal with the skew thus identified. For instance, the suspect vertex or the data processed by the suspect vertex may then be altered to remove or reduce the data skew of the suspect vertex, thereby allowing faster processing of the job or future jobs due to reduced data skew.

The trigger instruction may then be executed (act 606), to thereby cause the performance outlier vertex to gather the data distribution information (act 607). As an example, the scheduler 405 might execute the trigger instruction. The user interface module 513 perhaps may include a control 514 that the user may interact with in order to cause the trigger instruction to be run, and thereby cause the data distribution information to be gathered. The user interface 513 may also be used to display the gathered data distribution information to allow the user to identify data skew and potential solutions.

The trigger instruction returns a small amount of results (as represented by arrow 526) to the user interface module 513 and that further allow for further diagnostics of the source of data skew. For instance, the results of the trigger instruction may include simple characteristics (e.g., statistics) of the data to perhaps verify the presence of data skew and the characteristics of the data skew. In some embodiments, the subquery results in little processing against the set of data since only statistics regarding the set of data is gathered. For instance, the processing of the trigger instruction against the set of data of the performance outlier vertex may be much less than what the processing node performed in order to perform the vertex itself.

The method 600 also includes automatically analyzing the data distribution information to identify one or more solutions for resolving data skew represented by the data distribution information (act 608). Finally, the method 600 may include automatically performing at least one of the one or more solutions for resolving the data skew represented by the gathered data distribution information (act 609).

Figure 7:
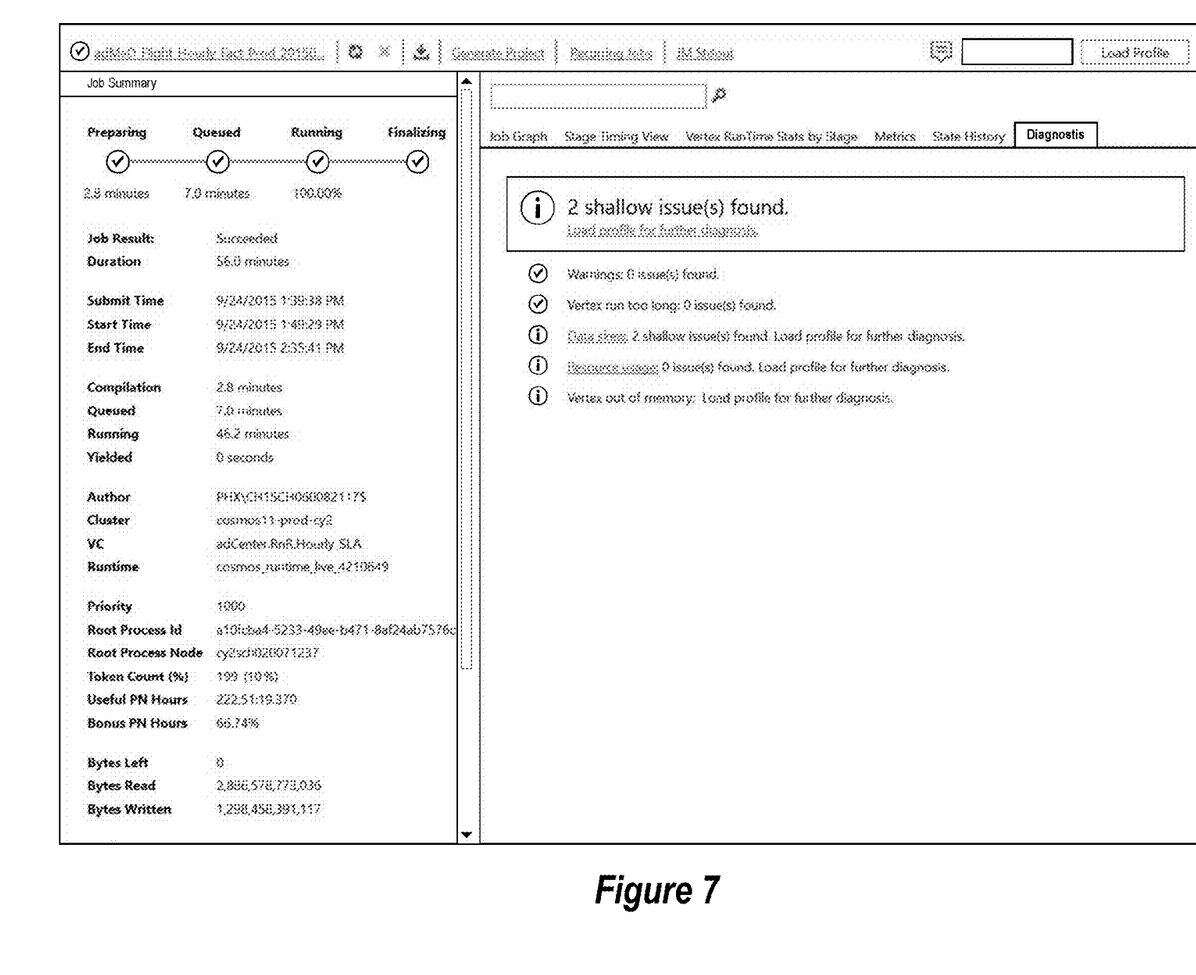
FIG. 7 illustrates an example user interface that may be generated by the user interface module, and includes job summary information in the left pane, and summary information about the possible sources of data skew in the right pane.

FIG. 7 illustrates an example user interface that may be generated by the user interface module. FIG. 7 illustrates job summary information in the left pane. The right pane shows summary information about possible sources of data skew. Accordingly, the principles described herein start with detection based on a wide set of data based on a model of big data jobs and associated statistical telemetry about their execution. The detection phase may identify several query stages (sets of related and parallelizable tasks) where the maximum execution time for a few parallel tasks varies widely from the norm.

Figure 8:
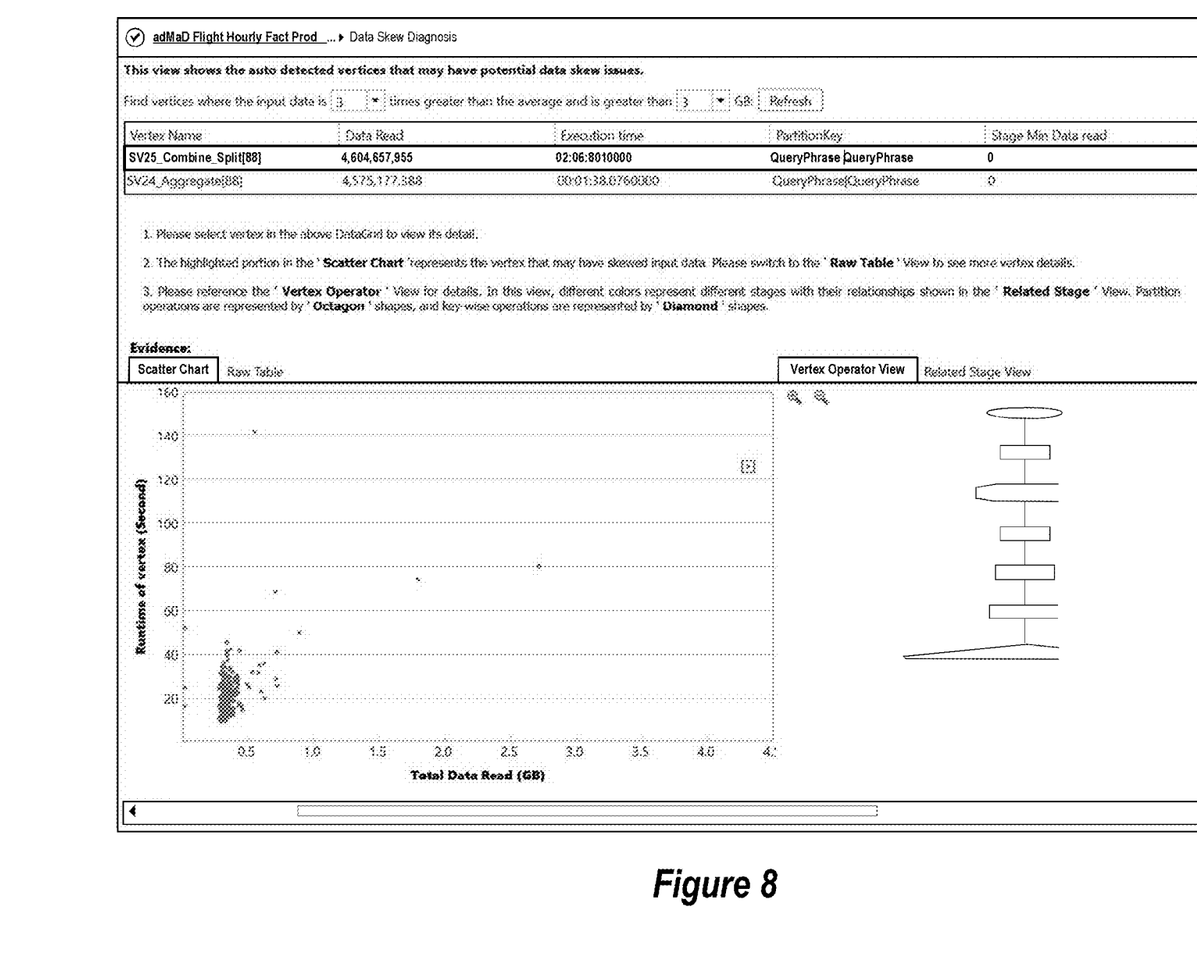
FIG. 8 illustrates a subsequent user interface that may be navigated to from the user interface of FIG. 7 and that includes the scatter chart.

These tool alerts for the possibility of data skew and guides the developer thru a sequence of steps. This begins with a scatter chart of the task execution times to visualize outliers, with the ability to select individual tasks for further investigation. The internal logic of these tasks is also visualized as a flow chart. FIG. 8 illustrates a subsequent user interface that may be navigated to from the user interface of FIG. 7 and that includes the scatter chart.

The upper portion of the user interface of FIG. 8 allows the user to define how far off the performance norm the user interface should focus on as potential suspect vertices. The lower left pane plots sample points, each sample point representing the total data read (on the horizontal axis) versus the runtime of the vertex (on the vertical axis). This allows for quick visualization of suspect vertices that are performance outliers. The box encompassing one of the vertex shows that the user or the system has selected a suspect vertex that had an unusually high number of read data, and an unusually long runtime. Data showing a flowchart of the processing of this vertex is represented in the lower right pane.

Figure 9:
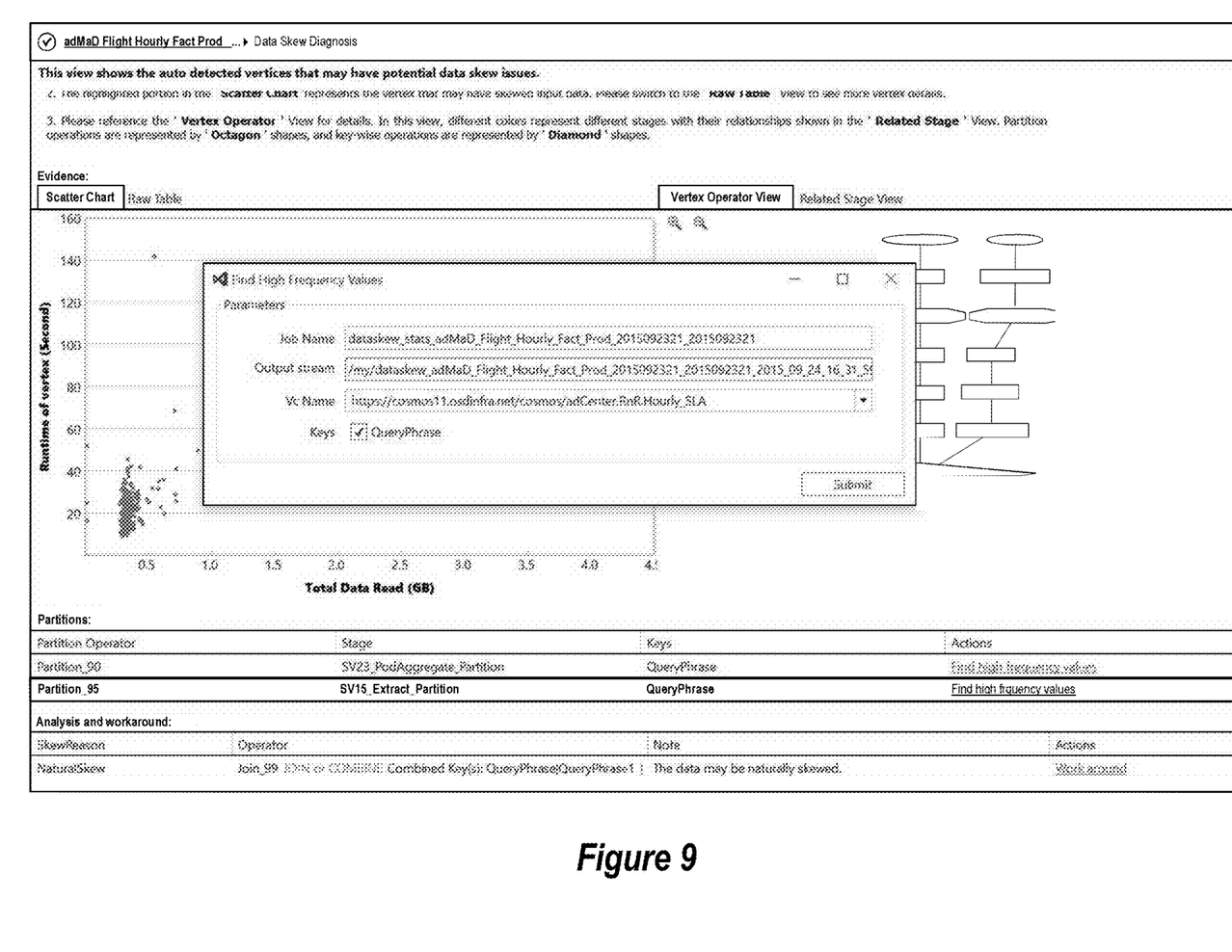
FIG. 9 illustrates a further detailed view of the statistics associated with the suspect vertex.
Figure 10:
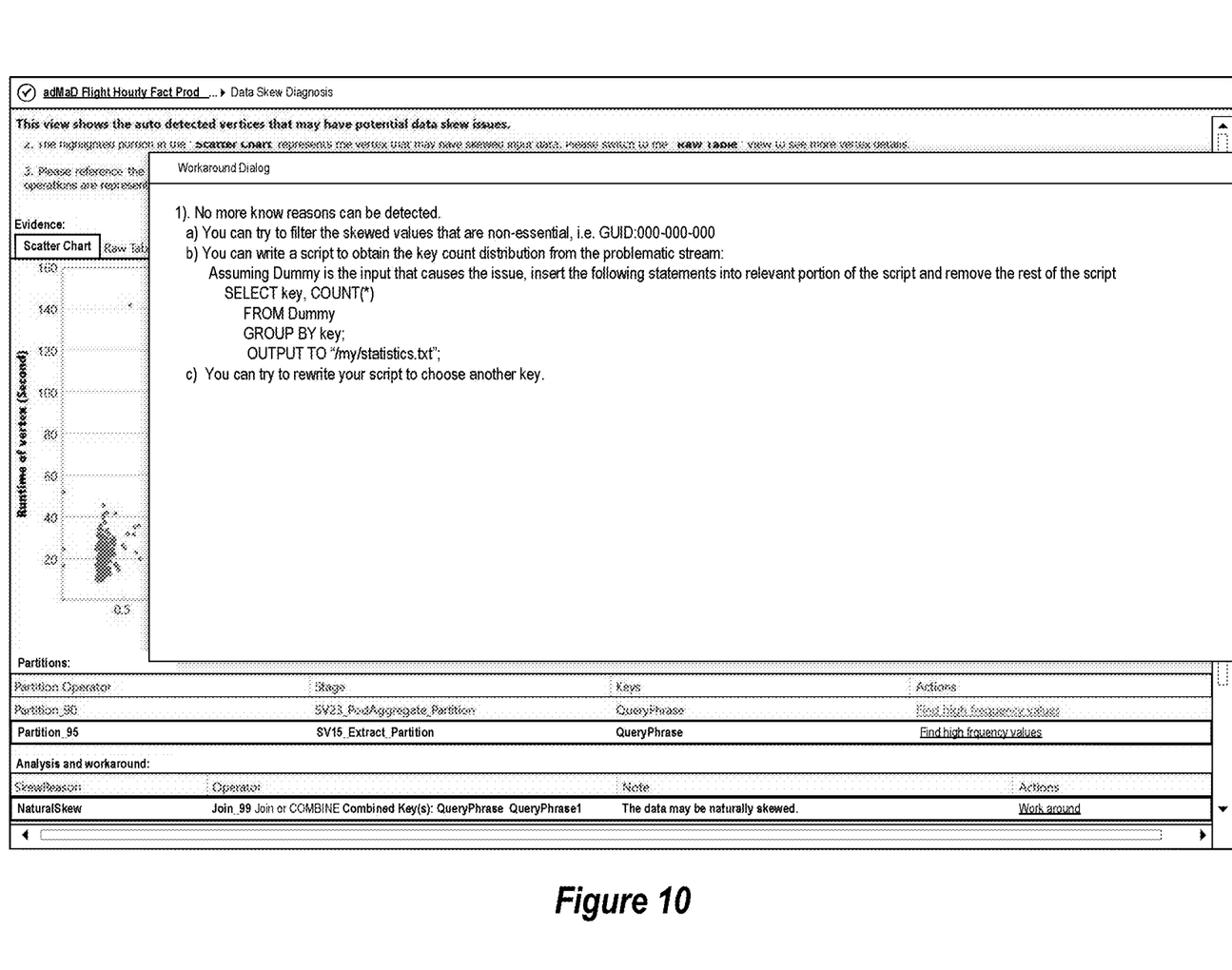
FIG. 10 illustrates a user interface that provides suggested fixes given the nature of the data discovered by the subquery.

FIG. 9 illustrates a further detailed view of the statistics associated with the suspect vertex. The additional statistics includes parameters of the vertex including the job name, output stream, and vertex name. The submit button would allow the user to submit a query against the data operated upon by the vertex so that characteristics of that data may be evaluated. FIG. 10 illustrates a user interface that provides suggested fixes given the nature of the data discovered by the subquery.

The tools then allow the submission of a special script to the system that is exactly like the original query but stops at the point where the suspected skew occurs. This special script then submits a query that only generates counts for the individual buckets in a partition. This special query returns detailed information that allows adjustment of the original query or pipeline to deal with the skew thus identified.

This approach significantly reduces the problem space in skew detection. It allows, during a single run, to identify the location of skewed data processing and to run truncated queries to identify the actual skewed distributions. This avoids running a large set of experiments to find distributions in multiple datasets/queries in the same script. It also saves resources by collecting meta-data only rather than processing all data in the subsequent investigation phase.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processor(s); and
one or more computer-readable hardware storage device(s) having stored thereon computer-executable instructions that are executable by the one or more processor(s) to cause the computing system to gather data distribution information from a specific performance outlier vertex of a distributed stage of a distributed job without re-performing the distributed stage by causing the computing system to perform at least the following:
identify a performance outlier vertex of a distributed stage of a plurality of parallel vertices, the performance outlier vertex having a performance that varied from a performance norm of other vertices in one or more prior performance(s) of the distributed stage, the performance norm being determined by identifying how the other vertices operated during the one or more prior performance(s), said identifying including identifying one or more of the following: an amount of time the other vertices used to perform the one or more prior performance(s) or a number of data operations the other vertices executed to perform the one or more prior performance(s); and
after the one or more prior performance(s) of the distributed stage, formulate a script that includes a trigger instruction that is structured to trigger the performance outlier vertex to gather data distribution information of data that the performance outlier vertex processed in at least one of the one or more prior performance(s) of the distributed stage, the trigger instruction in the script being structured to trigger the performance of the performance outlier vertex to gather the data distribution information without causing the distributed stage to be performed.

2. The computing system in accordance with claim 1, the trigger instruction in the script being structured such that, when executed by a scheduler that scheduled the distributed stage during the at least one of the one or more prior performance(s), causes the scheduler to trigger the performance outlier vertex to gather the data distribution information.

3. The computing system in accordance with claim 1, wherein the one or more prior performance(s) of the distributed stage comprises only a single prior performance of the distributed stage.

4. The computing system in accordance with claim 1, wherein the one or more prior performance(s) of the distributed stage comprises at least one performance of the distributed job.

5. The computing system in accordance with claim 1, wherein the one or more prior performance(s) of the distributed stage comprises a performance of only a portion of the distributed job, the portion including the distributed stage.

6. The computing system in accordance with claim 1, wherein execution of the computer-executable instructions further causes the computing system to:
for each of at least some of a plurality of vertices that do data processing of a vertex of the distributed stage, gather processing information regarding the data processing of the corresponding vertex for at least one of the one or more prior performance(s) of the distributed job.

7. The computing system in accordance with claim 6, wherein identifying the performance outlier vertex comprises:
analyzing the gathered processing information to find the performance outlier vertex.

8. The computing system in accordance with claim 1, wherein execution of the computer-executable instructions further causes the computing system to:
present a user interface that includes a representation of the performance outlier vertex.

9. The computing system in accordance with claim 1, wherein execution of the computer-executable instructions further causes the computing system to:
present a user interface that includes a control that causes the trigger instruction in the script to be executed.

10. The computing system in accordance with claim 1, wherein execution of the computer-executable instructions further causes the computing system to:
execute the trigger instruction in the script to thereby trigger the performance outlier vertex to gather the data distribution information.

11. The computing system in accordance with claim 10, wherein execution of the computer-executable instructions further causes the computing system to:
present a user interface that includes a representation of the data distribution information.

12. The computing system in accordance with claim 10, wherein execution of the computer-executable instructions further causes the computing system to:
automatically analyze the data distribution information to identify one or more solution(s) for resolving data skew represented by the data distribution information.

13. The computing system in accordance with claim 12, wherein execution of the computer-executable instructions further causes the computing system to:
automatically perform at least one of the one or more solution(s) for resolving the data skew represented by the gathered data distribution information.

14. A method for causing a computer system, which includes a processor and a computer-readable hardware storage device having instructions that are executable by the processor, to gather data distribution information from a specific performance outlier vertex of a distributed stage of a distributed job without re-performing the distributed stage, the method being performed by the computer system and comprising:

identifying a performance outlier vertex of a distributed stage of a plurality of parallel vertices, the performance outlier vertex having a performance that varied from a performance norm of other vertices in one or more prior performance(s) of the distributed stage, the performance norm being determined by identifying how the other vertices operated during the one or more prior performance(s), said identifying including identifying one or more of the following: an amount of time the other vertices used to perform the one or more prior performance(s) or a number of data operations the other vertices executed to perform the one or more prior performance(s); and     after the one or more prior performances of the distributed stage, formulating a script that includes a trigger instruction that is structured to trigger the performance outlier vertex to gather data distribution information of data that the performance outlier vertex processed in at least one of the one or more prior performance(s) of the distributed stage, the trigger instruction in the script being structured to trigger the performance of the performance outlier vertex to gather the data distribution information without causing the distributed stage to be performed.

15. The method in accordance with claim 14, the one or more prior performance(s) of the distributed stage comprising only a single prior performance of the distributed stage.

16. The method in accordance with claim 14, further comprising:

for each of at least some of a plurality of vertices that do data processing of a vertex of the distributed stage, gathering processing information regarding the data processing of the corresponding vertex for at least one of the one or more prior performance(s) of the distributed job.

17. The method in accordance with claim 16, wherein identifying the performance outlier vertex comprises:

analyzing the gathered processing information to find the performance outlier vertex.

18. The method in accordance with claim 14, further comprising:

executing the trigger instruction in the script to thereby trigger the performance outlier vertex to gather the data distribution information.

19. The method in accordance with claim 18, further comprising:

automatically interpreting the data distribution information to identify one or more solution(s) for resolving data skew represented by the data distribution information; and     automatically performing at least one of the one or more solution(s) for resolving the data skew represented by the gathered data distribution information.

20. One or more computer-readable hardware storage device(s) having stored thereon computer-executable instructions that are executable by one or more processor(s) of a computing system to cause the computing system to gather data distribution information from a specific performance outlier vertex of a distributed stage of a distributed job without re-performing the distributed stage by causing the computing system to at least:

identify a performance outlier vertex of a distributed stage of a plurality of parallel vertices, the performance outlier vertex having a performance that varied from a performance norm of other vertices in one or more prior performance(s) of the distributed stage, the performance norm being determined by identifying how the other vertices operated during the one or more prior performance(s), said identifying including identifying one or more of the following: an amount of time the other vertices used to perform the one or more prior performance(s) or a number of data operations the other vertices executed to perform the one or more prior performance(s); and     after the one or more prior performances of the distributed stage, formulate a script that includes a trigger instruction that is structured to trigger the performance outlier vertex to gather data distribution information of data that the performance outlier vertex processed in at least one of the one or more prior performance(s) of the distributed stage, the trigger instruction in the script being structured to trigger the performance of the performance outlier vertex to gather the data distribution information without causing the distributed stage to be performed.

\* \* \* \* \*